United States Patent
Cullen et al.

(10) Patent No.: US 6,272,528 B1
(45) Date of Patent: *Aug. 7, 2001

(54) COMPUTER METHOD FOR DELIVERY OF FINANCIAL SERVICES

(75) Inventors: Terence David Cullen, Hants; James Patrick Neill, Slough, both of (GB)

(73) Assignee: International Computers Limited, Londa (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,493

(22) Filed: Jul. 2, 1998

(30) Foreign Application Priority Data

Aug. 2, 1997 (GB) .................................................. 9716290
Sep. 18, 1997 (GB) .................................................. 9719844

(51) Int. Cl.[7] .................................................. G06F 15/16
(52) U.S. Cl. .............................. 709/202; 709/317; 705/4; 705/36; 705/37
(58) Field of Search .................................. 705/4, 35, 36, 705/37, 38; 709/201, 228, 202, 317

(56) References Cited

U.S. PATENT DOCUMENTS

| | | | |
|---|---|---|---|
| 4,831,526 | * | 5/1989 | Luchs et al. ............................... 705/4 |
| 5,655,085 | * | 8/1997 | Ryan et al. ................................ 705/4 |
| 5,850,517 | * | 12/1998 | Verkler et al. ........................ 709/202 |
| 5,862,325 | * | 1/1999 | Reed et al. ............................ 709/201 |
| 5,873,071 | * | 2/1999 | Ferstenberg et al. ................... 705/37 |
| 6,009,456 | * | 12/1999 | Frew et al. ............................ 709/202 |
| 6,049,819 | * | 4/2000 | Buckle et al. ......................... 709/202 |
| 6,134,580 | * | 10/2000 | Tahara et al. .......................... 709/202 |
| 6,148,327 | * | 11/2000 | Whitebread et al. .................. 709/202 |

FOREIGN PATENT DOCUMENTS

WO 95/15635 * 6/1995 (WO) ............................ H04L/12/24

OTHER PUBLICATIONS

Robert S. Gray, "Ph.D. Thesis proprosal: Transportable Agents", Department of Computer Science, Dartmouth College, New Hampshire. May 19, 1995.*
Chavez et al., "Kasbah: An Agent Marketplace for Buying and Selling Goods", MIT Media Lab, Cambridge, MA. Jul., 1996.*
Gilbert et al., "IBM Intelligent Agents", IBM Corporation, Research Triangle Park, NC. Jan. 21, 1997.*

* cited by examiner

Primary Examiner—Vincent Millin
Assistant Examiner—Hani M. Kazimi
(74) Attorney, Agent, or Firm—Lee, Mann, Smith, McWilliams, Sweeney & Ohlson

(57) ABSTRACT

A computer system is provided for delivery of financial services, such as banking, general insurance, life assurance, pensions and investments, loans and mortgages, and financial planning and advisory services. The system comprises a number of user computers connected to a plurality of server computers by way of a network, such as the Internet. The system creates at least one mobile agent which obtains details of a user's requirements, obtains financial information from the server computers on behalf of the user in the light of the user's requirements, and then transports itself to the user's computer to deliver the financial information to the user.

8 Claims, 12 Drawing Sheets

COMPUTER METHOD FOR DELIVERY OF FINANCIAL SERVICES

BACKGROUND TO THE INVENTION

This invention relates to computer systems for the delivery of financial services. Financial services include banking; general insurance; life assurance, pensions and investments; loans and mortgages; and financial planning and advisory services.

One of the channels for delivery of financial services is the Internet. For example, a customer wishing to purchase vehicle insurance, or a broker acting on behalf of a client, could access the websites of a number of insurance companies to obtain the cheapest quotation or get a quotation which is most suitable to a consumer's needs. Similarly, a consumer requiring advice about investments or pensions could access the websites of life assurance companies, banks or brokers.

This results in a number of problems for a consumer. The workings of the Internet are complex and a consumer may find it difficult to find the most appropriate sources of financial services. Financial products can be complicated so that a consumer may have difficulty in comparing the relative merits of each quotation. Similarly, financial advice can be complicated, and a consumer may have difficulty in understanding its relevance and so may be unable to apply the appropriate recommendations.

The object of the present invention is to provide a way of alleviating the problems discussed above.

The present invention makes use of an existing technology referred to herein as "mobile agents" (or simply "agents"). A mobile agent is software, which is able to transport itself between a number of different locations within a computer network (e.g. the Internet) and can, within limits, execute at any of those locations. Tools for providing an environment in which such agents can operate are commercially available from a number of different vendors including IBM (product is Aglet Work Bench), Fujitsu (Kafka), General Magic (Odyssey), ObjectSpace (Voyager), and Mitsubishi (Concordia). However, the present invention is not restricted to the use of any particular one of these tools. The embodiment of the invention to be described below uses Java as the agent programming language.

SUMMARY OF THE INVENTION

According to the invention there is provided a computer system for delivery of financial services, the system comprising a plurality of user computers connected to a plurality of server computers by way of a network, and at least one mobile agent, said mobile agent comprising:

(a) means for obtaining details of a user's requirements and for obtaining financial information from the server computers on behalf of the user in the light of the user's requirements; and (b) means for transporting said mobile agent over the network to the user computer of said user, and for delivering the financial information to the user at the user computer.

It can be seen that the invention allows the user to delegate the task of finding the information to the mobile agent. The agent can travel around the network, visiting the server computers or meeting agents from financial services companies on other host agent servers, to obtain the information required by the user, and then to report back to the user.

For example, the server computers may belong to insurance companies, and may provide access to information about vehicle insurance policies. The agent may visit the servers to obtain quotations on behalf of the user (customer or a broker), in the light of the user's requirements, and then report back with the lowest cost or most suitable quotation. Alternatively, the user's agent may broadcast its requirements to the insurance companies in the form of a mission statement, and then wait on its own server for the insurance company agents to come and visit it with the information it needs.

As another example, the server computers may belong to life assurance companies, and may provide access to information about private pension policies. The agent may visit the servers to obtain performance comparisons on behalf of the user, in the light of the user's requirements, and then report back with the most suitable product. Alternatively, the user's agent may broadcast its requirements to the life companies in the form of a mission statement, and then wait on its own server for the life company agents to come and visit it with the information it needs.

Preferably, the agents are allowed to negotiate with each other. For example, this may allow a service provider to sell a policy against other competitive interests. This negotiation may result in a lower price premium, some change to the policy details, some additional identifiable added value which may be of interest to the user (such as windscreen insurance cover, in the case of a vehicle policy, or a free premiums holiday in the case of a life policy), or an alternative product.

DESCRIPTION OF AN EMBODIMENT OF THE INVENTION

One computer system for delivery of financial services in accordance with the invention will now be described by way of example with reference to the accompanying drawings.

This particular example is concerned with vehicle insurance, involving obtaining quotations and processing applications, claims and renewals. However, it will be appreciated that other embodiments of the invention may be concerned with other forms of financial services, such as buildings insurance, life assurance, pensions and mortgages, or combinations of these services.

Overall View of the System

Figure 1:
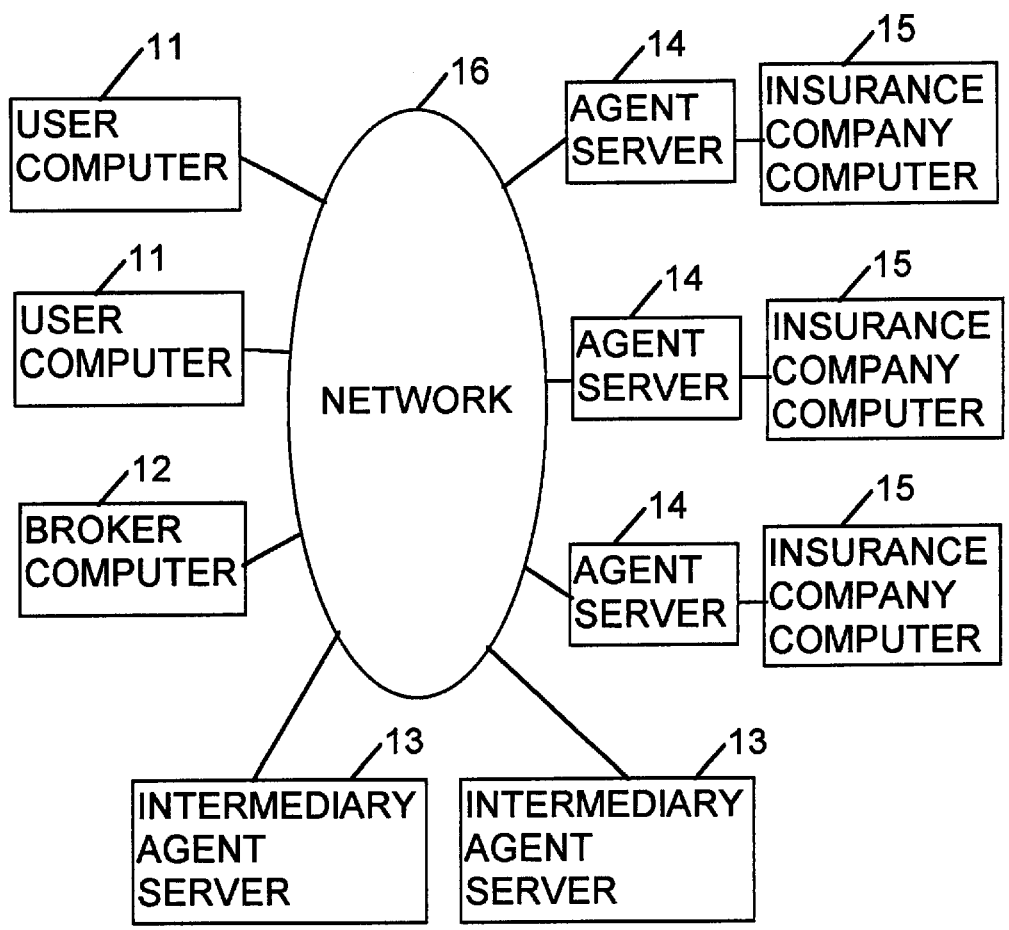
FIG. 1 is a diagram of a computer system embodying the invention.

Referring to FIG. 1, the system comprises a number of computers, including user computers 11, broker computers 12, intermediary agent servers 13, and agent servers 14. The computers 11–14 can communicate with each other by way of a network 16. In the present example, the network 16 is the Internet, but in other embodiments of the invention it may be an Intranet (i.e. a private network, based on Internet technology), or some other form of network.

The agent servers 14 belong to individual insurance companies. Each provides an agent space in which mobile agents can run. Each of the agent servers 14 is linked to an insurance company computer 15, which holds a database of the company's products and customers, and provides access to underwriting and workflow services.

The user computers 11 belong to individual customers. The broker computers 12 are similar to the user computers, but belong to brokers acting on behalf of customers, or may be sited in public kiosks. The computers 11, 12 may for example be personal computers (PCs), or network computers (NCs).

The intermediary agent servers 13 belong to agent service providers. These agent service providers may also be, for example, internet service providers (ISPs), banks, insurance companies, or consortium of the aforementioned. Each intermediary agent server provides the following:

An agent space in which mobile agents can run.

An agent library, containing templates for creating a number of agents which are maintained by this computer.

A user preferences and profile store, for storing information about users.

A directory server, for accessing a globally distributed agent directory (in this example, an X.500 directory) that can be used to locate an agent to perform a particular service. Agent vendors can publish information about their agents in this directory.

Each intermediary agent server 13 runs a static agent referred to herein as a holding-pen agent, which provides the following services to users:

Validate users when they log on.

Create agents on behalf of users.

Track all agents belonging to a user.

Validate agents when they ask for user-specific information, and give this information only to agents, which are trusted by the user.

Notify agents of trigger events.

The holding-pen agent also provides the following:

Customer session initiation. It sets up an interactive session when a customer decides to log-in and uses the services provided by the intermediary agent server.

A place for agents to go when a customer logs-out. Some agents will no longer be needed when a customer logs-out (e.g. the user's agent-manager agent). Other agents will simply sleep until their customer logs back in, and some agents will work while the user is logged-out. The holding-pen agent offers a place for agents to sleep and work from.

Agent view provision. Many agents will need to personalise themselves based on customer lifestyle and interface preferences and in some cases the channel through which they will present themselves to users. They will also need session information so they can authenticate the user.

Log-In

Figure 2:
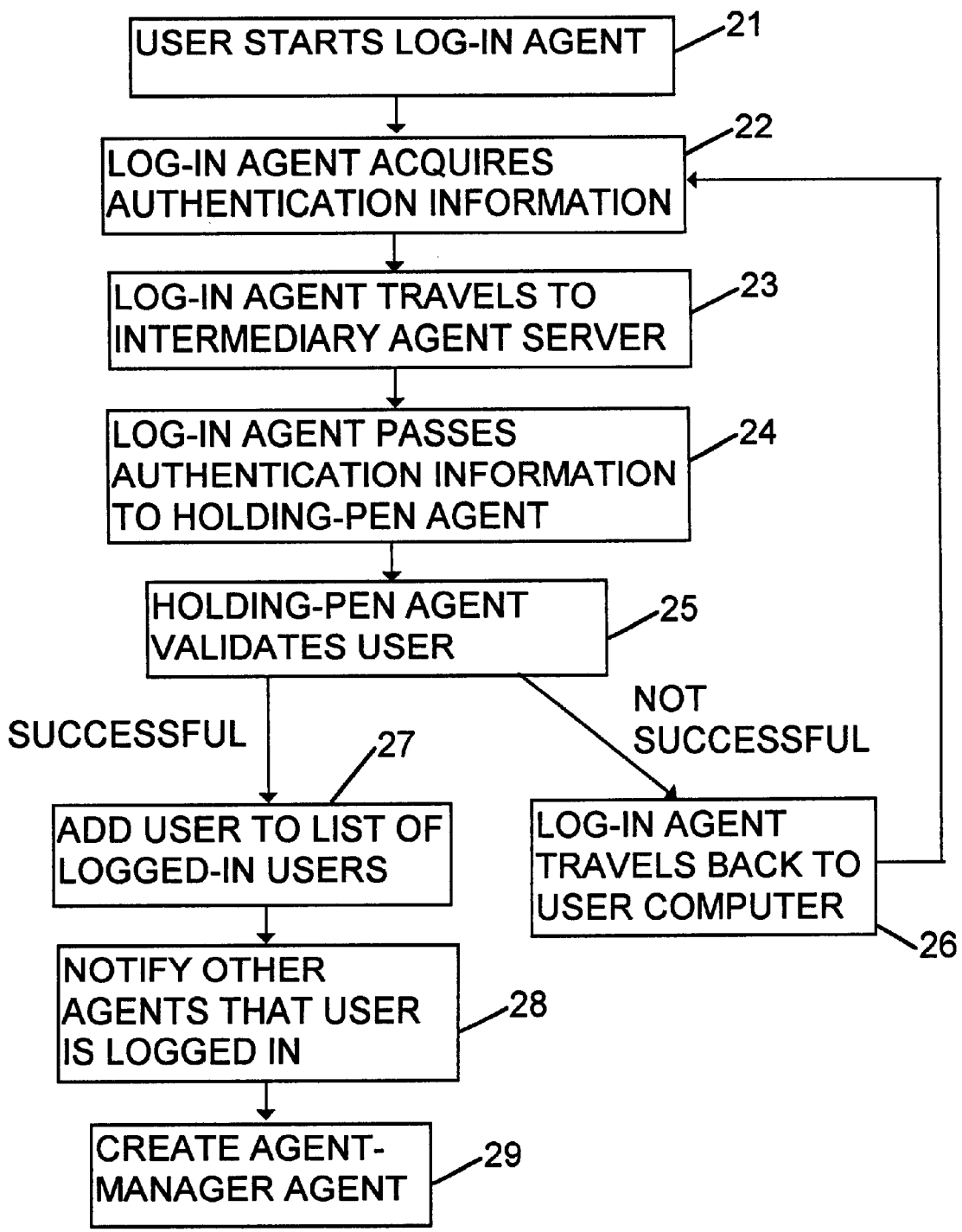
FIG. 2 is a logic flow diagram showing a Log-In operation.

FIG. 2 shows a log-in procedure, by which a user can log in to the system in order to use agent services.

(Step 21) The user activates a log-in agent, located on the user's computer 11.

(Step 22) When activated, the log-in agent performs a dialog with the user, to acquire authentication information such as user name and password.

(Step 23) When it has acquired the authentication information, the log-in agent transports itself to one of the intermediary agent servers 13.

(Step 24) At the intermediary agent server, the log-in agent passes the authentication information to the local holding-pen agent.

(Step 25) The holding-pen agent validates the authentication information. There are two possible outcomes to this: either the authentication is successful or the authentication is invalid.

(Step 26) If the validation is not successful, the holding-pen agent informs the log-in agent of this. The log-in agent then travels back to the user's computer, and Step 22 is performed again.

(Step 27) If the authentication is successful, the holding-pen agent adds the user to its list of logged-on users.

(Step 28) At the same time, the holding-pen agent checks the agent directory to locate any existing agents that are currently owned by or are working on behalf of the user. The holding-pen agent sends a message to each of these agents to inform them that the user is now logged-in and where the user can be contacted.

(Step 29) The holding-pen agent creates an agent-manager agent, which will manage the user's agent interface. Also, the holding-pen agent creates a preference agent for the user, to handle requests for information about user preferences.

Agent-Manager Agent

In this example, the agent-manager agent is a mobile agent. However, in other embodiments of the invention, it may be a static agent. The agent-manager agent allows the user to perform the following actions:

Create an agent.

Instruct an agent to perform a particular task for which it is designed

Stop an agent

Delete an agent.

Retract an agent; i.e. bring it home to the user's computer.

Find an agent to perform a particular task.

Display charges due from the user.

The agent-manager agent also:

Acts as a presentation layer, through which other agents can communicate with the user.

Personalizes the presentation in accordance with the user's preferences.

Customizes the presentation in accordance with the particular user computer type. This means that agents do not have to carry around with them the baggage associated with personalization and customization.

Presents representations of the agents to the user

Figure 3:
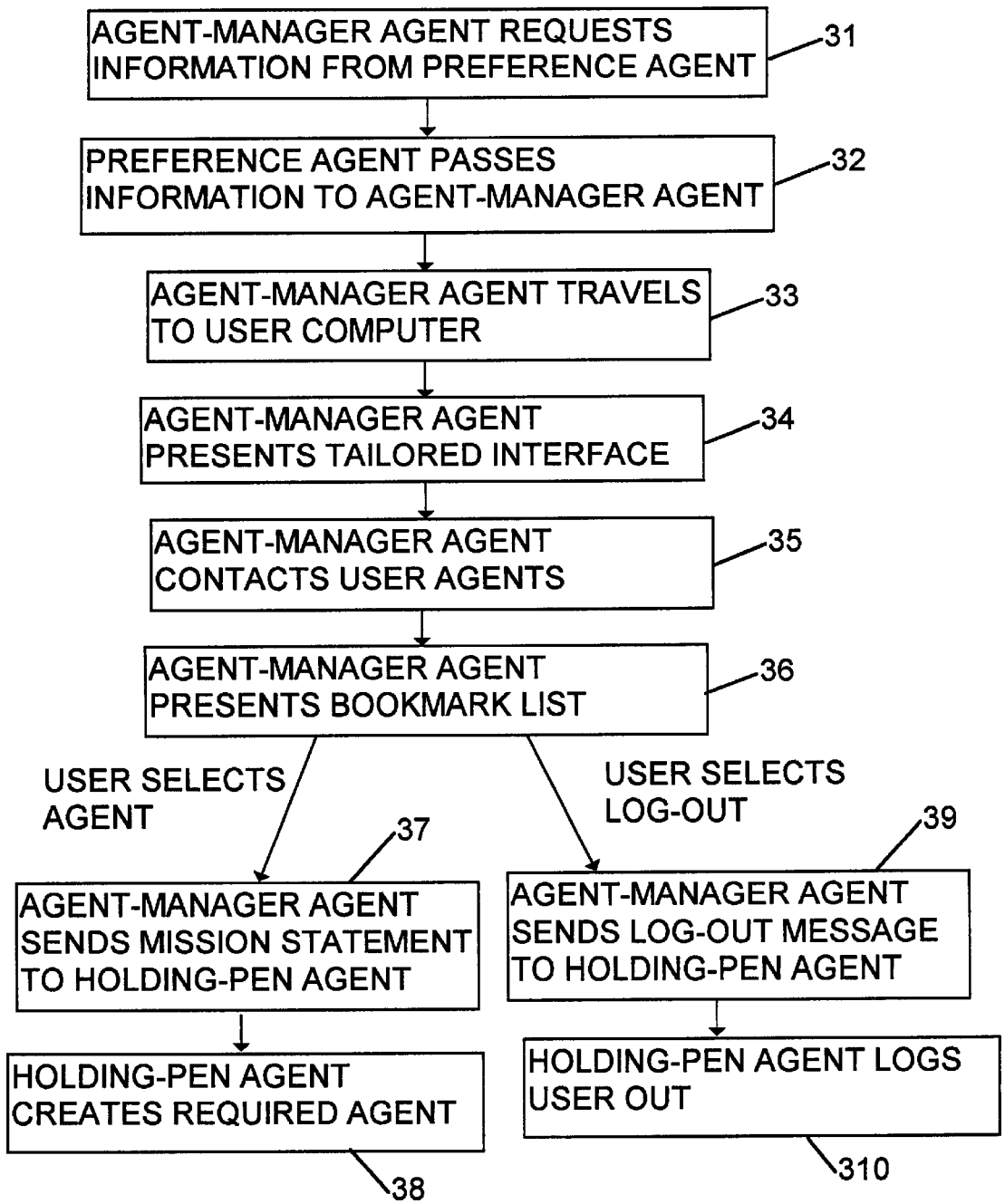
FIG. 3 is a logic flow diagram showing the operation of an agent-manager agent.

Displays the position of the user's agents; which may be running on the user's computer or on some other computer in the network FIG. 3 shows the operation of the system following creation of the agent-manager agent in Step 29 above.

(Step 31) The agent-manager agent first asks the user's preference agent for initial consumer information, and uses this to tailor its interface for both the device and consumer. Typical information the agent-manager agent requires is: "What agents can the consumer create" and "What device is the consumer at".

(Step 32) The preference agent responds by passing the requested information to the agent-manager agent.

(Step 33) The agent-manager agent then travels to the user's computer.

(Step 34) When it arrives at the user's computer, the agent-manager agent presents its tailored interface to the user.

(Step 35) The agent-manager agent then sends a message to all agents that are currently working on behalf of the user, requesting them to pass back their details (e.g. representation). These agents may be working on the user's computer or on other computers in the network. When these agents return the details, the agent-manager agent updates a display, showing all the agents currently belonging to the user.

(Step 36) The agent-manager agent also presents the user with a bookmark list, comprising a list of agents available for the user to select. These agents include both generic agents and third party agents. Third party agents are those which are not managed directly by the agent service provider, but have been used in the past by the user. Generic agents are pre-defined templates waiting to be initialised, and may include agents for performing a number of different financial services for the user, such as insurance, mortgages, pensions and so on. Each of these bookmarks points to an X.500 directory entry which identifies the holding-pen agent to be used in creating the agent in question.

The user can then select one of the agents from the bookmark list, or can select "Log-out".

(Step 37) If the user selects one of the agents (e.g. an insurance or financial adviser agent) from the bookmark list, the agent-manager agent sends a message referred to herein as a mission statement to the holding-pen agent to be used in creating the selected agent. The mission statement includes the identity of the user, the location of the computer which the user is currently using, and the name of the holding-pen agent the agent should communicate with in order to find out more information.

(Step 38) When the holding-pen agent receives the mission statement, it creates the required agent and supplies it with the mission statement. This information enables the agent to begin personalizing itself.

(Step 39) Alternatively, if the user selects "Log-out", the agent-manager agent sends a message to the holding-pen agent with which the user is logged in, informing it that the user is logging-out of the agent service.

(Step 310) When the holding-pen agent receives this message, it removes the user from its list of logged-in users. It should be noted that agents already working on behalf of the user would continue to work for the user, even though the user has logged out.

Insurance Agent

Figure 4:
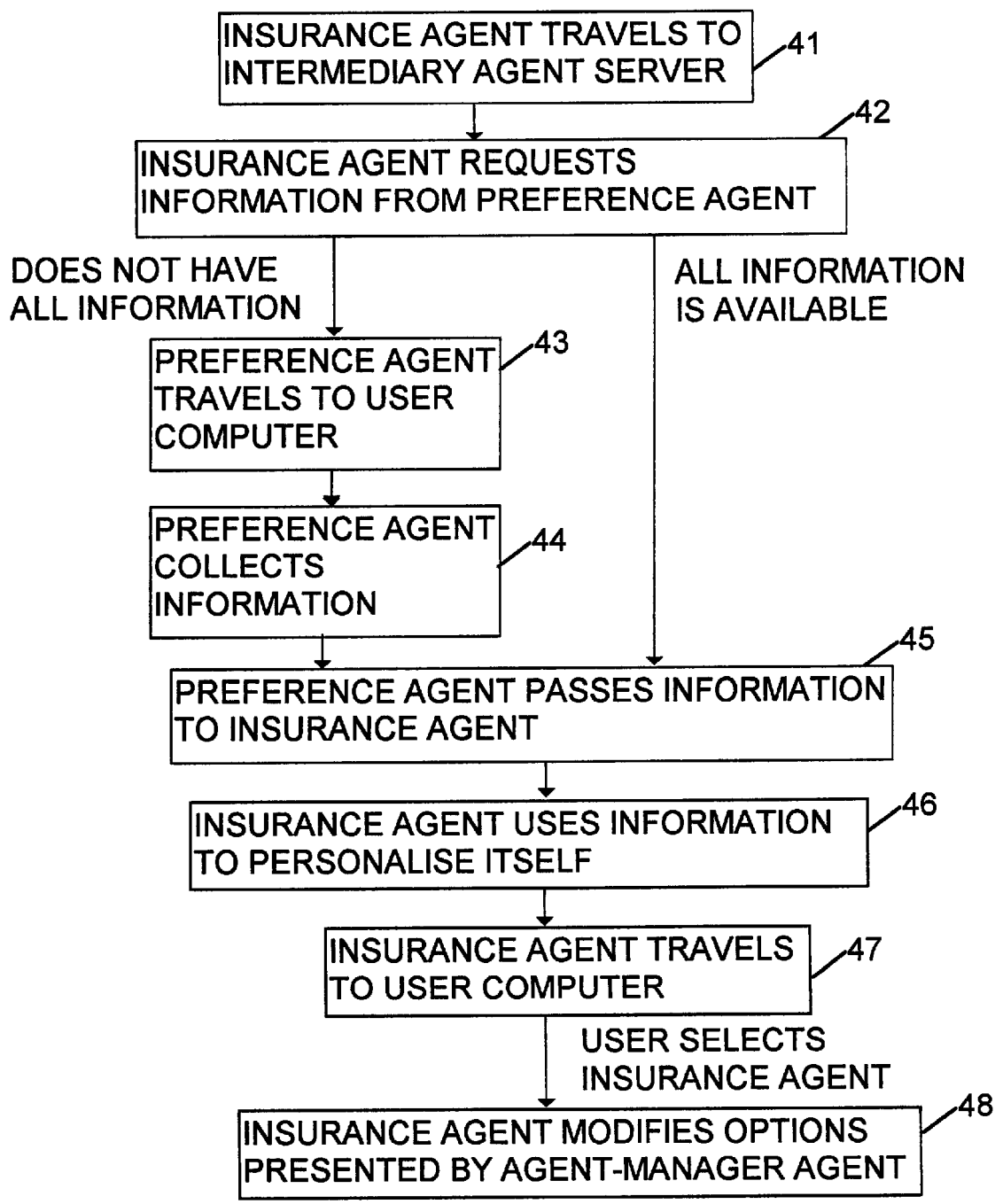
FIG. 4 is a logic flow diagram showing the operation of an insurance agent.

FIG. 4 shows the operation of the system following creation of insurance agent (see Step 38 above).

(Step 41) The insurance agent travels to the intermediary agent server 13.

(Step 42) When it arrives at the intermediary agent server, the insurance agent requests information from the user's preference agent.

(Step 43) If the user's preference agent does not have all the required information, the preference agent transports itself to the user's computer 11.

(Step 44) At the user's computer, the preference agent collects the required information from the user.

(Step 45) The preference agent then sends a message to the insurance agent, containing the requested information.

(Step 46) The insurance agent uses the information received from the preference agent to further personalise itself.

(Step 47) The insurance agent then transports itself to the user's computer, where it uses the agent-manager agent to offer its services to the user.

(Step 48) When the insurance agent is selected by the user, the insurance agent modifies the options presented by the agent-manager agent to include among others, the following services:

Request a least cost quotation
Request the most suitable quotation
Request general company and policy information
Apply on basis of preferred quotation
Make adjustment to policy
Update preferences and/or personal information
Make a claim The user can then select any one of these options.

Least Cost Quotation Option

Figure 5A:
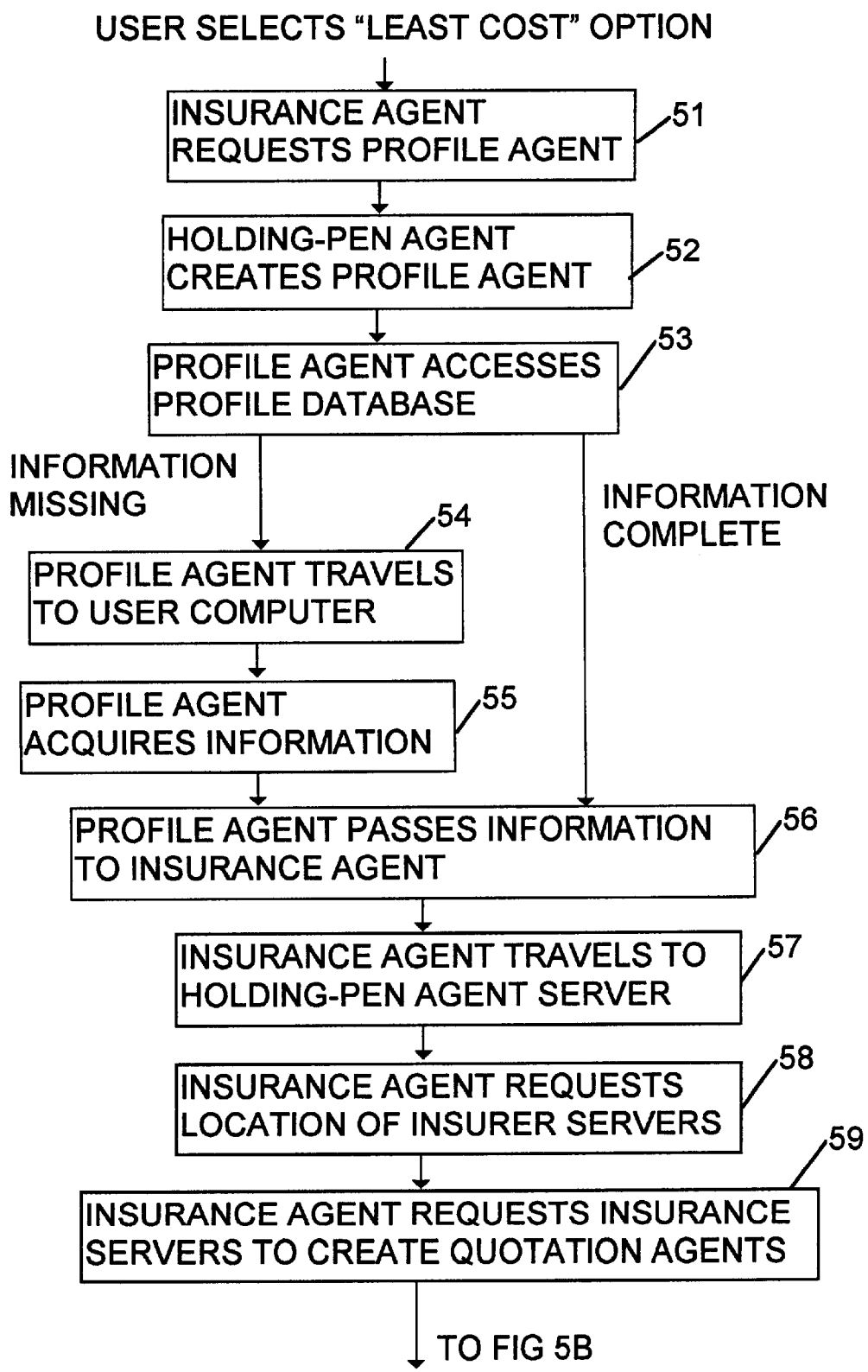
FIG. 5 is a logic flow diagram showing the operation of an insurance agent when obtaining a quotation for the cheapest vehicle insurance.
Figure 5B:
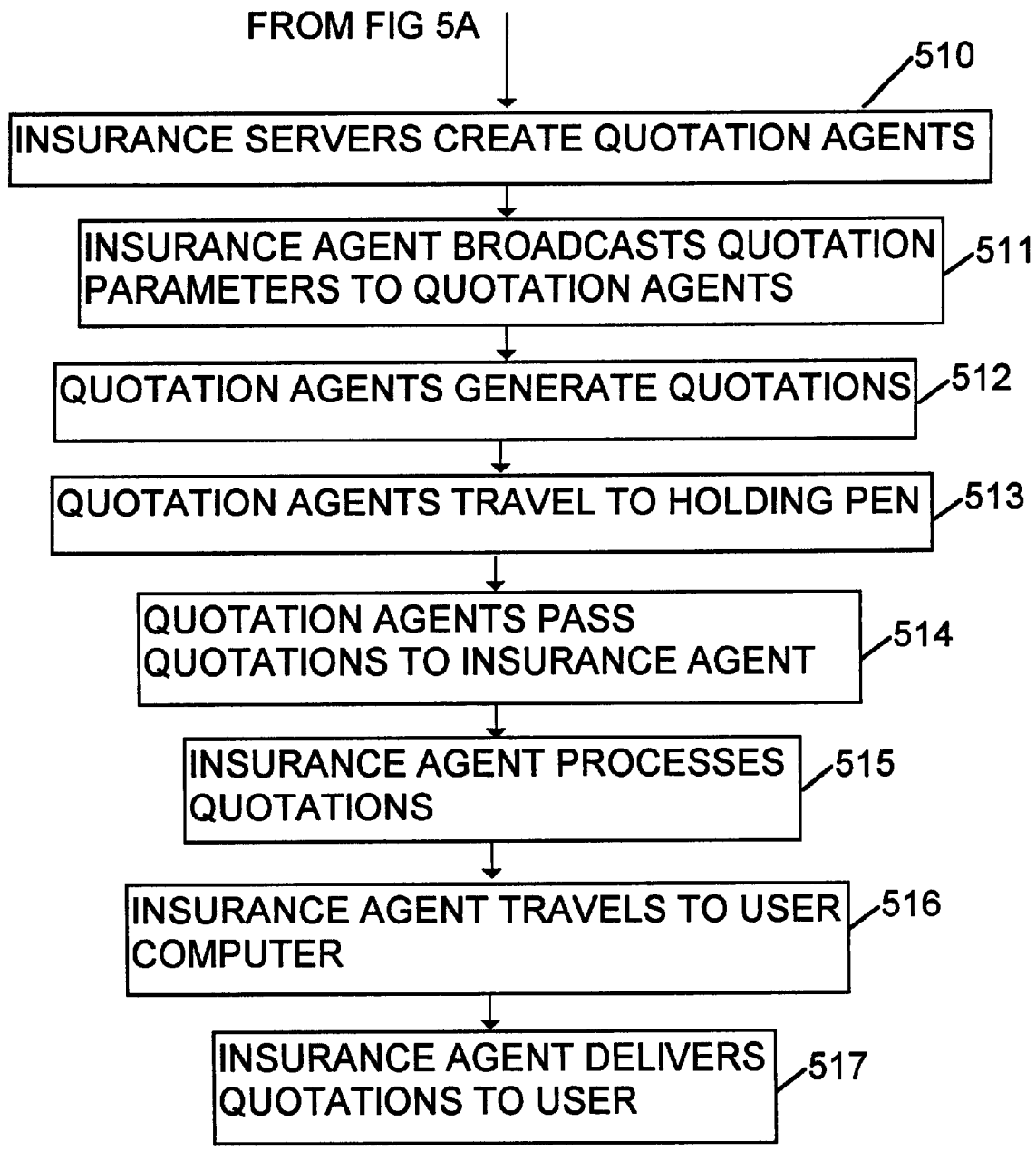

If the user selects the "least cost" option, operation proceeds as shown in FIGS. 5a and 5b.

(Step 51) The insurance agent sends a message to the appropriate holding-pen agent, requesting it to create a profile agent. The message contains a mission statement identifying the information that the insurance agent needs to know.

(Step 52) The holding-pen agent creates the required profile agent.

(Step 53) The profile agent picks up information from the profile database and compares this information with the information specified in the mission statement.

(Step 54) If information is missing, or it is considered that some information is out of date, the profile agent transports itself to the user's computer to obtain the required information.

(Step 55) At the user's computer, the profile agent asks the user for the required information.

(Step 56) When the information has been gathered from the user, the profile agent passes it to the insurance agent.

(Step 57) When the insurance agent receives the required information from the profile agent, it transports itself to its holding-pen agent server.

(Step 58) When the insurance agent arrives at the holding-pen agent server, it asks the holding-pen agent server for the location of all appropriate insurer servers. The holding-pen agent server checks the X.500 directory to find the locations of the insurer servers, and passes this information to the insurance agent.

(Step 59) The insurance agent then broadcasts a message to all these insurer servers, requesting them to create quotation agents. The message includes a mission statement.

(Step 510) In response to this message, each of the insurer servers creates a quotation agent.

(Step 511) The insurance agent then broadcasts a set of quotation parameters to these quotation agents, specifying details of the required insurance policy.

(Step 512) When they receive these quotation parameters, the quotation agents perform calculations so as to generate quotations, based on insurer-specific underwriting rules.

(Step 513) When each quotation agent completes its calculation, it transports itself to the holding-pen where the insurance agent is located.

(Step 514) When the quotation agents arrive at the holding-pen where the insurance agent is located, they pass their quotation details to the insurance agent. These includes standard quotation, damage excess, fire and theft excess, and accidental damage excess. This information may also include loyalty scheme information and cross-product offering information.

(Step 515) The insurance agent processes the information and arranges the quotations in order of price.

(Step 516) The insurance agent then transports itself back to the user's computer. If, however, the user has logged-out in the meantime, the agent can stay on the holding-pen and may send a message to the user, if for example, the user has a mobile phone which supports messaging.

(Step 517) When it arrives at the user's computer, the insurance agent delivers the quotations to the user, and makes recommendations to the user.

Most Suitable Quotation Option

Figure 6:
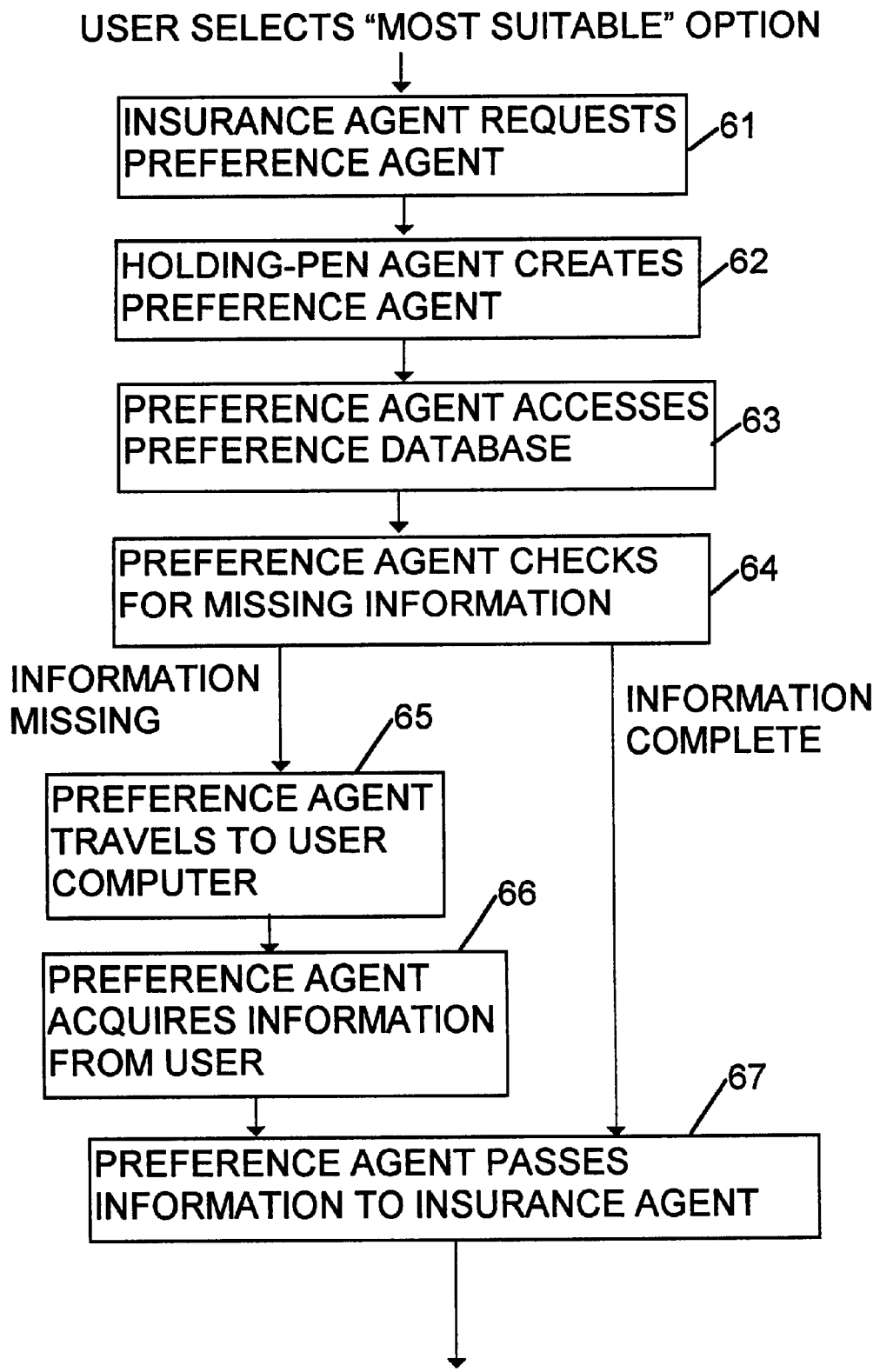
FIG. 6 is a logic flow diagram showing additional operations of an insurance agent when obtaining a quotation for vehicle insurance which meets the user's preferences.

The operation of the system in the case where the user selects the "most suitable quotation" option will now be described with reference to FIG. 6. This option attempts to find the insurance policy which will give best value, based on the user's preferences, such as:

What does the user want from the vehicle insurance policy?

Is price important?

Is excess cover cost important?

In this case, the operation of the insurance agent is similar to that for the "least cost" option, except that the following steps are also performed.

(Step 61) The insurance agent sends a message to the appropriate holding-pen agent, requesting it to create a preference agent (in addition to requesting a profile agent, as shown in Step 51). This request includes a mission statement, which identifies the information the insurance agent needs to know. The preference agent manages choice for the user. In this case, it will need to manage information regarding the importance to the user of selecting a generic financial service product, selecting a generic insurance policy, and finally selecting a vehicle insurance policy.

(Step 62) The holding-pen agent creates a preference agent.

(Step 63) The preference agent accesses the preferences database, to obtain preference information relating to the user.

(Step 64) The preference agent then checks what information is missing from the mission statement requirements. It also checks with the insurance agent which of the missing information it requires from the user.

(Step 65) If the preference agent is instructed to ask for any missing information, it transports itself to the user's computer.

(Step 66) At the user's computer, the preference agent requests the required information from the user.

(Step 67) When it has obtained the required information from the user, the preference agent passes this information to the insurance agent.

The operation of the insurance agent now proceeds in a similar manner to that described above in Steps 57–59, 510–517. In this case, however, the quotations from the quotation agents take account of the preference information, which was sent to the insurers when the insurance agent broadcast its request for quotations. Also in this case, when the insurance agent processes the quotations, it arranges them in order of suitability, on the basis of the user's preferences. For complex user requirements, the insurance agent may choose to off-load this processing to a distributed rules server (not shown).

Negotiation Between Agents

Figure 7:
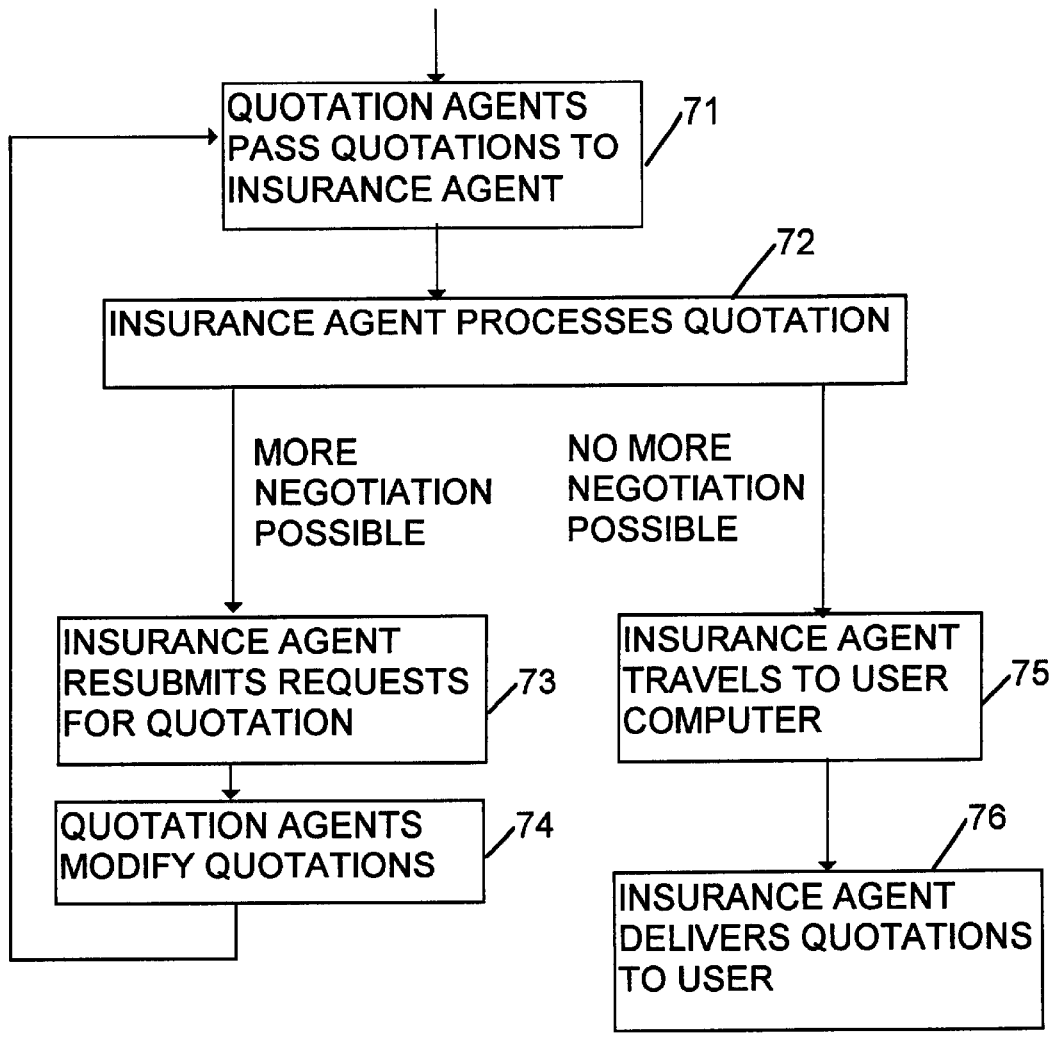
FIG. 7 is a logic flow diagram showing an insurance agent and quotation agents negotiating over quotations for vehicle insurance.

Preferably, the insurance agents and quotation agents are empowered to negotiate with each other, so as to obtain, from the insurance agent's perspective, the best deal for the user, and from the quotation agent's perspective, a sale for the service provider. In this case, the process described above would be modified as follows (see FIG. 7).

(Step 71) As described above, the quotation agents pass their quotations to the insurance agent.

(Step 72) Following receipt of the quotations delivered by the quotation agents, the insurance agent processes the quotation details. The agent compares the information it receives with the mission statement it was originally provided with, and places the quotations in order of preference.

(Step 73) On a first pass, or on subsequent receipt of amended quotations, or if a quotation agent signals that further negotiation is possible regarding its quotation, the insurance agent re-submits its request for a quotation again with an appropriate mission statement.

(Step 74) The quotation agents may then modify their quotations. This may involve simply reducing the premium, identifying extra features of the insurance product (hidden value within the policy such as free windscreen insurance), or modifying the features of the policy to reach a given price. Quotation agents that have amended their quotations pass their new quotations back to the user's insurance agent for processing. The above steps (Steps 72 to 74) may then be repeated, to perform another negotiation cycle.

(Steps 75, 76) When no more negotiation cycles are possible, the user's insurance agent transports itself back to the user's computer and makes its recommendations, as before.

Financial Adviser Agent

If the user selects a financial adviser agent from the bookmark list (at Step 37 above), a financial adviser agent is created as described in Step 38 above. The financial adviser agent then obtains information about customer preferences, and presents itself to the user in a manner analogous to that described above with reference to Steps 41 to 47.

When the financial adviser agent is selected by the user, it modifies the options presented by the agent-manager agent to include a number of financial advice services, such as for example:

Comparing pensions

Life planning

Planning for dependants

Tax planning

Inheritance planning

Shares and investments

Update preferences and/or personal information

The user can then select any one of these options.

Comparing Pensions Option

Figure 8A:
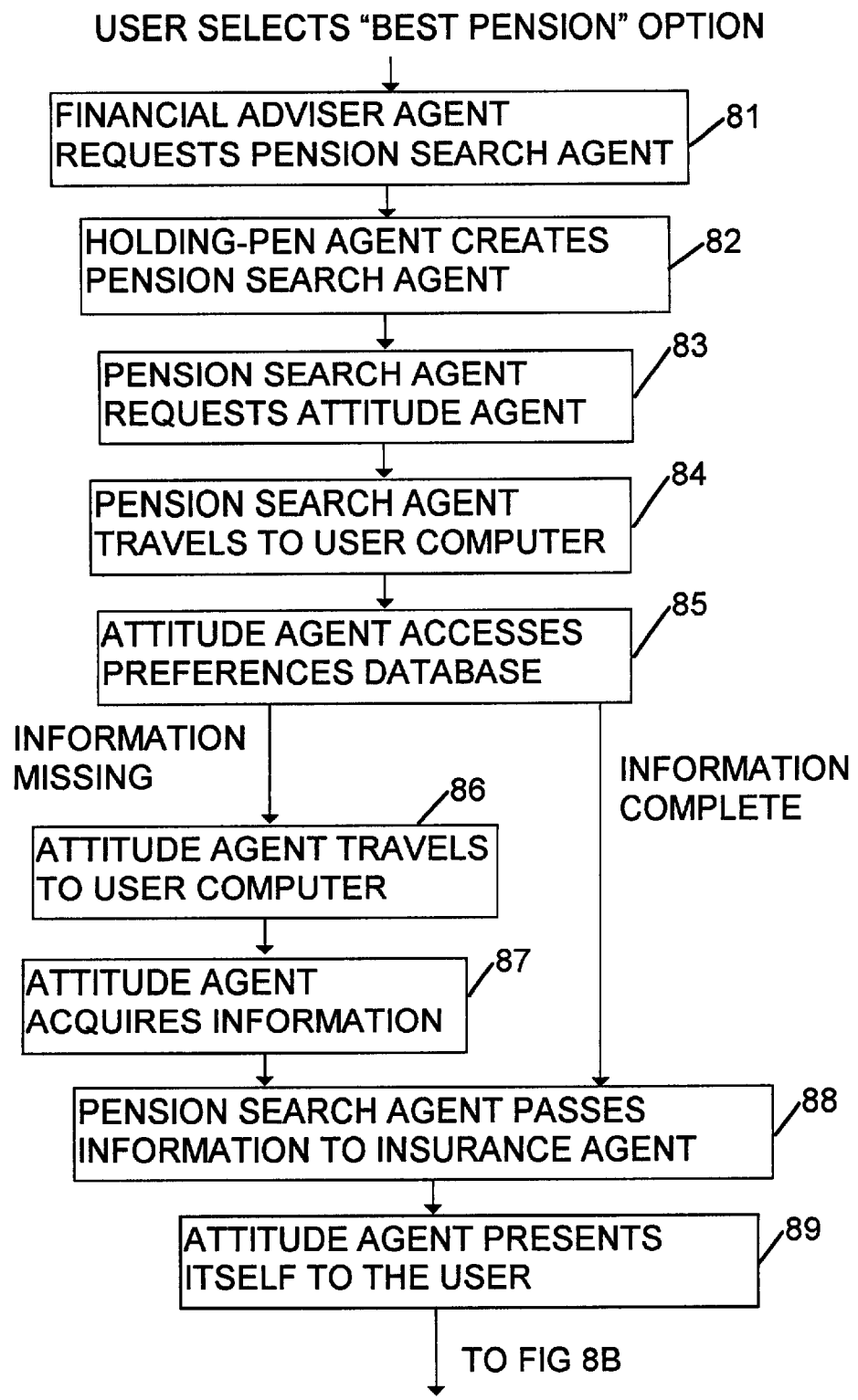
FIG. 8 is a logic flow diagram showing the operation of a pension search agent.
Figure 8B:
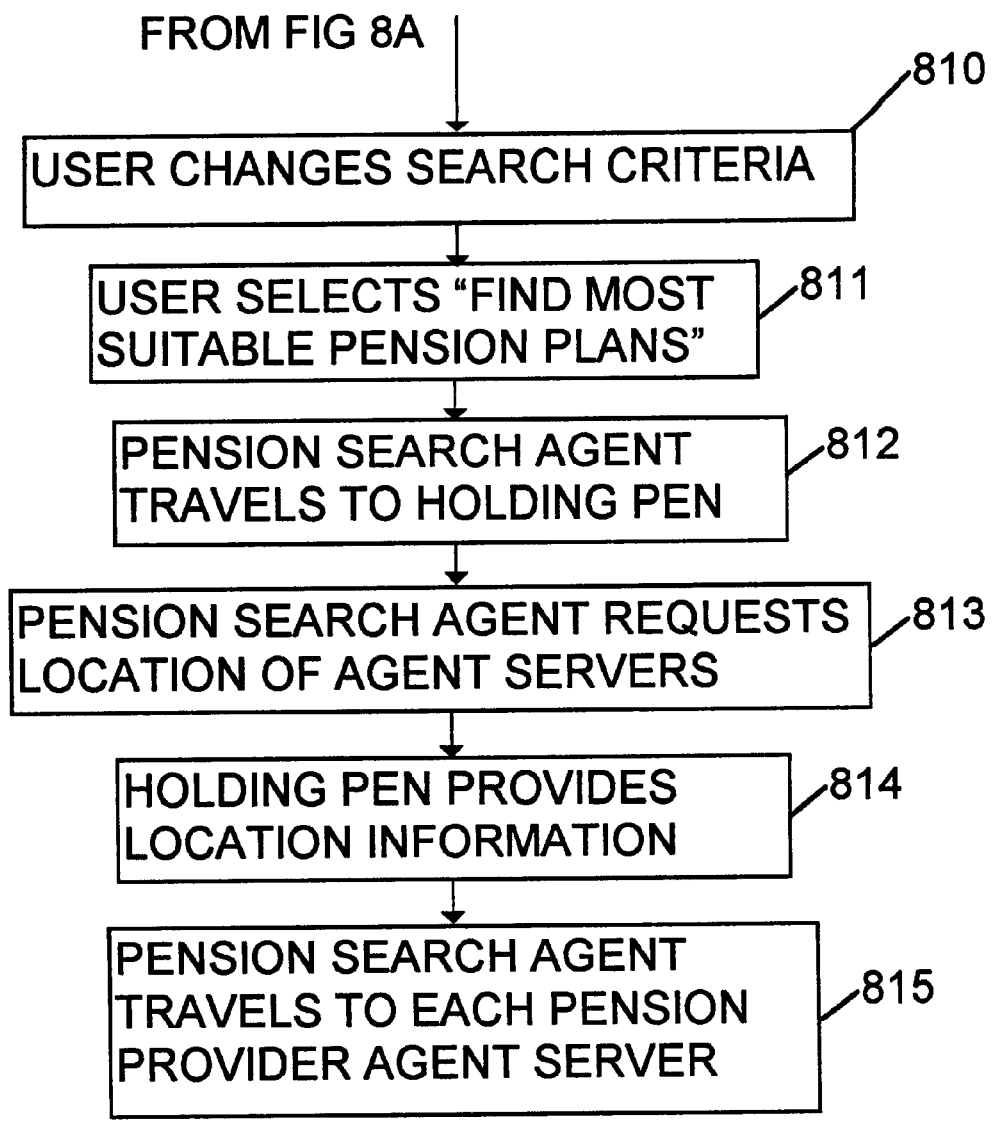

If the user selects the "Comparing pensions" option, operation proceeds as shown in FIGS. 8a and 8b.

(Step 81) The financial adviser agent sends a message to the holding-pen agent server, requesting it to create a pension search agent. The message contains a mission statement identifying the information that the pension search agent needs to know.

(Step 82 and 83) The holding-pen agent creates the pension search agent and an attitude agent. The attitude agent is a specialised preferences agent. It manages information about a user's attitude to financial advice and planning, about buying financial products, and about making investments, on behalf of a user. It uses this information to generate an attitude profile which can then be used by other agents to offer advice and to make recommendations. In this instance, it has been created to provide the pension search agent with information relating to the user's attitude to retirement, attitude to buying financial products, and attitude to a pension product's characteristics.

(Step 84) The pension search agent is transported to the user's computer.

(Step 85) The attitude agent picks up information from the preferences database and compares this information with the information specified in the mission statement.

(Step 86) If information is missing, or it is considered that some information is out of date, the attitude agent transports itself to the user's computer to obtain the required information.

(Step 87) At the user's computer, the attitude agent asks the user for the required information.

(Step 88) When the information has been gathered from the user, the attitude agent passes the information to the pension search agent.

(Step 89) The pension search agent then presents itself to the user, having modified itself through the agent-manager agent, on the basis of the user's preferences.

(Step 810) The user is then given the option of performing a number of tasks including changing pension search criteria, changing the weighting or importance of the search criteria, selecting a maximum number of suitable pensions, and changing preferences.

(Step 811) In this example, it is assumed that the user requests the pension search agent to find the five most suitable personal pension plans based on the user's defined weighted criteria. This option attempts to find the personal pension plan which will best meet the user's pension criteria, based on the user's preferences, such as:

the performance of the pension over specified time periods flexibility to allow change of plan the ability to be allowed free pension premium holidays aversion to risk (Step 812) The user's pension search agent moves to the agent holding-pen.

(Step 813) At the agent holding-pen, the pension search agent requests the location of agent servers which provide the information and services it requires. This may include life companies, banks and third party information sources which may have pension product database sources.

(Step 814) The agent holding-pen provides location information from its directory.

(Step 815) The pension search agent then visits each of the pension provider agent servers in turn, looking for the five most suitable personal pension plans based on the user's defined weighted criteria. It should be noted that, in this case, the pension search agent travels to the agent servers, rather than requesting the agent server services to visit it. This is to reduce processing on the pension search agent's holding pen, to reduce the volume of information which is communicated over the network, and so that negotiation and often complex information exchanging can be done speedily and efficiently in the appropriate environments, namely the agent servers.

Comparing Pension Products and Evaluating Results

Figure 9A:
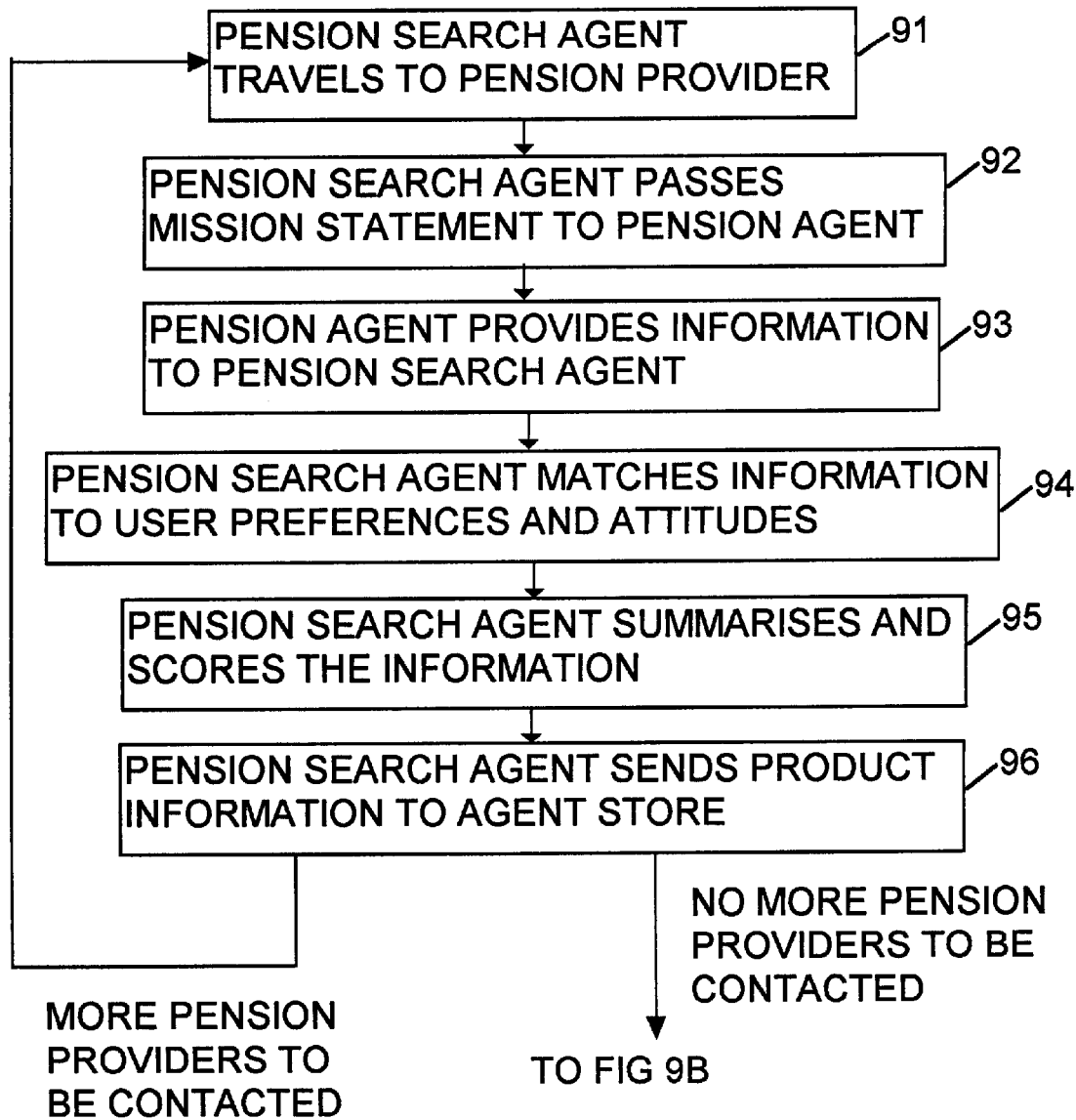
FIG. 9 is a logic flow diagram showing the operation of the pension search agent in visiting pension providers.
Figure 9B:
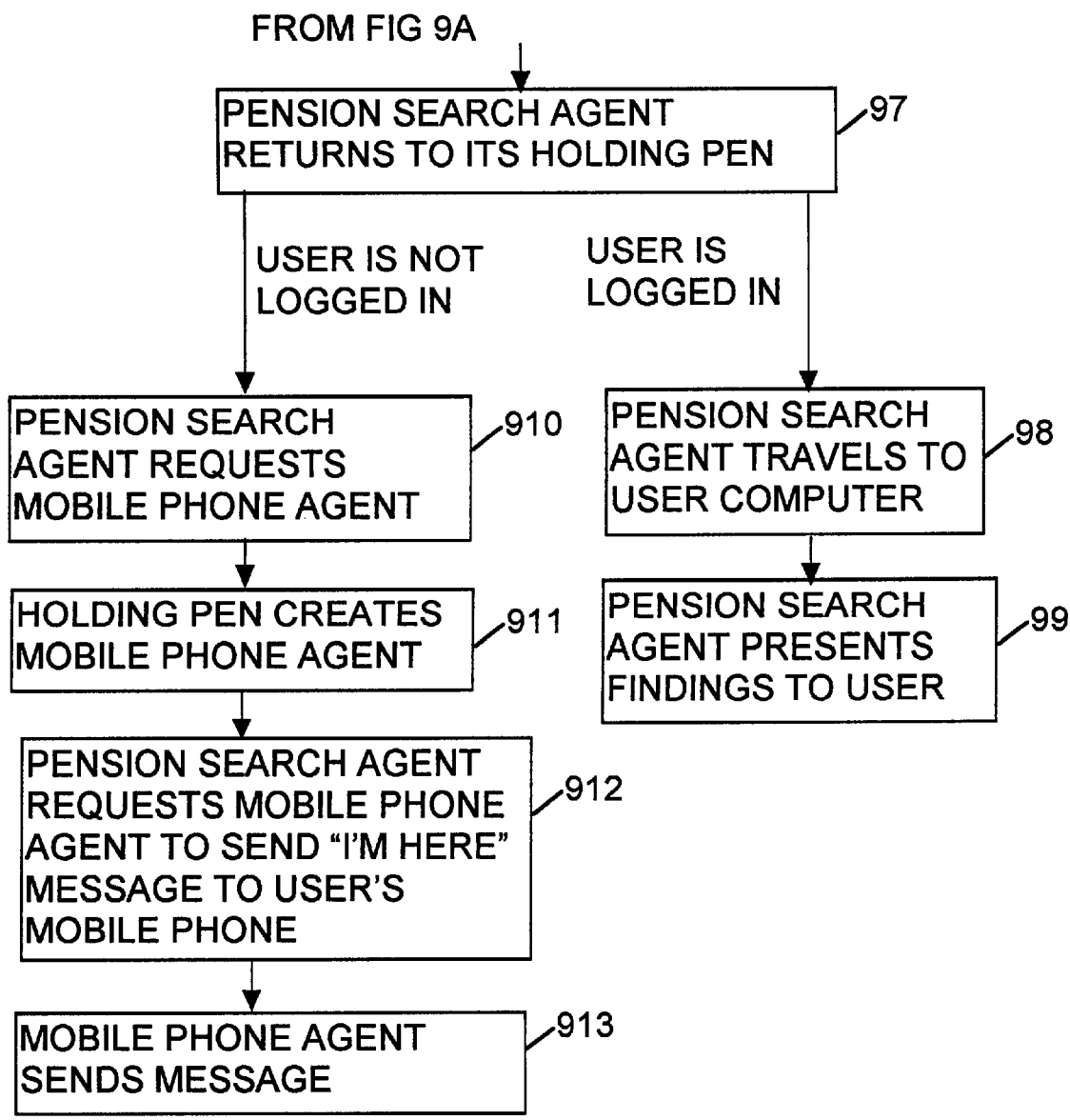

FIG. 9 shows the Step 815 in more detail.

(Step 91) The pension search agent travels to the pension provider agent server.

(Step 92) The pension search agent passes a mission statement to the pension company's pension agent. This mission statement tells the pension agent what task it has to perform, the information it is required to provide, and the format of this information.

(Step 93) The pension agent provides this information, or as much of it as possible, to the pension search agent. The pension agent may also provide affinity information (other product details, competitive information, branding) to help its case. If sufficient information has not been provided by the pension agent to allow the pension search agent to make a comparison, the pension search agent may:

alter its request to try and recover this information, or opt to ignore the missing detail if the information it has already received means that the pension plan would not be appropriate anyhow.

(Step 94) The pension search agent matches the information it has received from the service provider's agent to its user's preferences, choice and attitudes.

(Step 95) The pension search agent discards product information which neither meets the user's requirements nor falls into the category of best five pension plans. The agent maintains a summary of important product information locally and scores closeness of fit against the principle weighted criteria.

(Step 96) If the pension plan is appropriate, the pension search agent sends detailed information to the agent store on its holding pen. This may just include the best five pensions, so that whenever a new pension is included in the list a command is also sent to replace the fifth best with details of the new one, or alternatively the information may just be added to the list for the benefit of the user and to use as a basis for a new modified search.

When the pension search agent has finished its task at a particular pension provider, it moves onto the next agent server where steps 91 to 96 above re-occur.

(Step 97) When all the specified pension providers have been visited (or if it is requested to stop before completion of its tasks), the pension search agent returns to its agent holding pen.

(Step 98) If the user is currently logged-in, the agent holding pen instructs the pension search agent to return to the user's computer.

(Step 99) The pension search agent then presents its findings and recommendations to the user.

(Step 910) If the user is not currently logged in, the pension search agent may attempt (if for an example it has been instructed to do so or it is a user preference) to tell the user that it has completed its task. One way of doing this is by sending a short message (a 160 character string) to a mobile phone via one of the cellular carriers. In this case, the pension search agent requests the agent holding pen to create a mobile phone agent.

(Step 911) The agent holding pen creates the requested mobile phone agent, which in turn requests the user's mobile phone number from the user's Profile agent.

(Step 912) The pension search agent requests the mobile phone agent to send an "I'm here" message to the user's mobile phone.

(Step 913) The mobile phone agent sends the requested message.

When the user eventually logs in, the pension search agent will be delivered to the user's computer and will present its findings and recommendations to the user, as in Steps 98 and 99 above.

Some Possible Modifications

It will be appreciated that many modifications may be made to the system described above without departing from the scope of the present invention. In particular, the system may deliver other types of financial services and advice, instead of or in addition to those described above. For example, a lifeplan agent may be provided which delivers interactive financial advice based on a dynamic understanding of a user's lifestyle, attitudes and preferences.

The system may offer direct services to consumers who conduct their business from the home, from the office, while shopping or on the move. Similarly, the system may offer intermediary services to brokers and to financial advisers.

What is claimed is:

1. A method of operating a computer system for delivery of services to a plurality of users, the system comprising a plurality of user computers connected to at least one server computer by way of a network, said method comprising the steps:

(a) in response to a user successfully logging in to the system at one of said user computers, transporting an agent-manager mobile agent over said network from said server computer to said one of said user computers;

(b) operating said agent-manager mobile agent in said one of said user computers to present a list of service-provider mobile agents that are available for the user to select;

(c) in response to one of said service-provider mobile agents being selected by the user, operating said agent-manager mobile agent to send a mission statement to the server computer;

(d) in response to said mission statement being received at the server computer, creating a service-provider mobile agent in said server computer and operating the service-provider mobile agent to deliver a service to the user.

2. A method according to claim 1 wherein said agent-manager mobile agent provides a presentation layer through which service-provider mobile agents can interact with the user.

3. A method according to claim 2 wherein said agent-manager mobile agent customizes said presentation layer in accordance with the user's preferences.

4. A method according to claim 2 wherein said agent-manager mobile agent customizes said presentation layer in accordance with the user's computer type.

5. A method according to claim 1 wherein said agent-manager mobile agent keeps track of the locations of service-provider mobile agents that are acting on behalf of the user.

6. A method according to claim 1 wherein the step of operating the service-provider mobile agent to deliver a service to the user comprises broadcasting information request messages to a plurality of information-provider computers.

7. A method according to claim 6, further including:

(a) transporting a plurality of information-provider agents from said information-provider computers to said server computer; and (b) operating said information-provider agents in said server computer to supply information to said service-provider mobile agent.

8. A method according to claim 1 wherein the step of operating the service-provider mobile agent in said server computer to deliver a service to the user comprises:

(a) identifying a plurality of information-provider computers that can supply required information;

(b) transporting said service-provider mobile agent over said network from said server computer to each of said plurality of information-provider computers in turn;

(c) at each of said information-provider computers, operating said service-provider mobile agent to obtain information on behalf of the user.

* * * * *